United States Patent [19]
Tobise

[11] Patent Number: 5,245,257
[45] Date of Patent: Sep. 14, 1993

[54] CONTROL SYSTEM

[75] Inventor: Masahiro Tobise, Katsuta, Japan

[73] Assignee: Hitachi, Ltd., Tokyo, Japan

[21] Appl. No.: 736,783

[22] Filed: Jul. 29, 1991

[30] Foreign Application Priority Data

Jul. 30, 1990 [JP] Japan .................................. 2-201968

[51] Int. Cl.$^5$ .............................................. H02P 5/46
[52] U.S. Cl. ................................ 318/255; 388/907.5; 364/469
[58] Field of Search ............... 318/569, 600, 609, 610, 318/255; 364/468, 469, 470; 139/291 R, 327; 242/DIG. 1; 388/907.5

[56] References Cited

U.S. PATENT DOCUMENTS

| | | | |
|---|---|---|---|
| 4,437,046 | 3/1984 | Faillace | 318/571 |
| 4,835,699 | 5/1989 | Mallard | 364/470 |
| 4,893,262 | 1/1990 | Kalata | 364/567 |
| 4,943,927 | 7/1990 | Yarita et al. | 364/470 |
| 4,954,975 | 9/1990 | Kalata | 364/567 |
| 4,964,031 | 10/1990 | Gotoh | 364/138 |
| 4,981,091 | 1/1991 | Taylor et al. | 112/80.32 |
| 5,016,182 | 5/1991 | Bergland et al. | 364/469 |
| 5,034,897 | 7/1991 | Sainen | 364/470 |
| 5,041,070 | 8/1991 | Blaser | 493/14 |
| 5,046,535 | 9/1991 | Prat | 139/351 |
| 5,056,724 | 10/1991 | Prodi et al. | 242/18.1 |
| 5,060,161 | 10/1991 | Sainen | 364/470 |

FOREIGN PATENT DOCUMENTS

3715468 11/1988 Fed. Rep. of Germany .
3925104 2/1990 Fed. Rep. of Germany .

OTHER PUBLICATIONS

K. Saito et al., "Application of Fully Digital Speed Regulators to Tandem Cold Mills", *IEEE Transactions on Industry Applications*, vol. IA-20, No. 4, Jul./Aug. 1984, pp. 785–794.

D. Reiners, "Antriebstechnik im Automatisierungsverbund", *Technische Rundschau*, 48/87, Nov. 1987, pp. 58–62.

*Primary Examiner*—Bentsu Ro
*Attorney, Agent, or Firm*—Antonelli, Terry, Stout & Kraus

[57] ABSTRACT

A plant controller calculates the updated value of a control parameter for a motor controller for controlling motors for driving process machines in accordance with the change in the operational condition of a process plant so as to transmit it to the motor controller. The motor controller updates the set value of the control parameter relating to the control characteristics of the motor in accordance with the supplied updated value of the control parameter. The plant controller transmits the updated value of the control parameter to the motor controller in such a manner that the parameter code denoting the type of the control parameter and the updated value are allocated to predetermined bits of one word. The motor controller separates the received parameter code and the updated value from each other to change the setting of the control parameter, which corresponds to the parameter code, in accordance with the updated value.

24 Claims, 9 Drawing Sheets

| PC | TYPE OF PD |
|-----|------------|
| PC1 | K I |
| PC2 | H L |
| PC3 | L L |
| PC4 | |
| ⋮ | ⋮ |
| PCN | T N |

F I G. 10
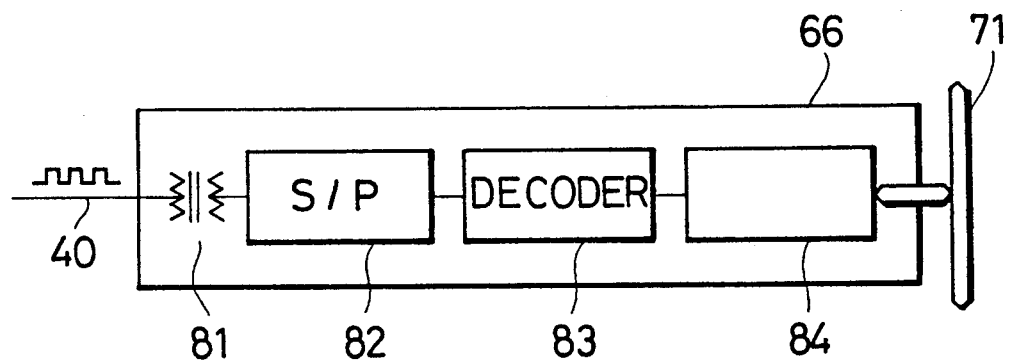
F I G. 11
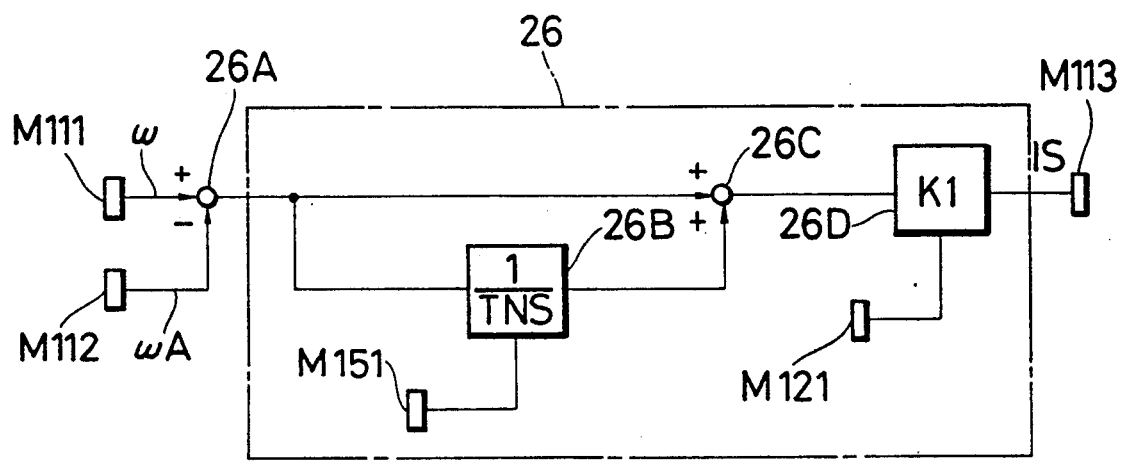

CONTROL SYSTEM

BACKGROUND OF THE INVENTION

1. Field of the Invention

The present invention relates to a control system for a manufacturing line or the like in a process plant, and, more particularly, to a control system capable of controlling a motor for driving a process machines in a process plant to correspond to changes in the running condition and the operational condition in the process.

2. Description of the Related Art

A process line such as a manufacturing line is specified by a rolling line, a physical distribution line and the like. A process line of this type is usually constituted in such a manner that it includes one or more process machines disposed along the line. Since the operational condition for the process machine closely relates to the change in the running condition or the like of the process line, the process machines must be collectively controlled by a process computer and/or a plant controller (hereinafter collectively called a "plant controller"). That is, a structure is required which is arranged in such a manner that a command is issued from the plant controller to each of the process machines in accordance with the change in the operational condition and the process machines are synchronously controlled in response to the above-described command to correspond to the change in the operational condition. For example, a process line for a rolling facility or an annealing facility in a rolling mill plant is constituted in such a manner that there are included a plurality of process machines such as rolled coil winders, milling rollers, bridle rolls, tension rolls, helper rolls and the like. In the process line thus-constituted, the speed of each of the motors for driving the corresponding process machines must be synchronously controlled to correspond to the change in the operational condition (such as the condition about the thickness of the rolled material). Hitherto, a structure has been employed in order to meet the above-described requirement, the structure being arranged in such a manner that a speed command is issued from the plant controller to motor controllers and each of the motor controllers controls the speed of the corresponding motor in accordance with the command thus-supplied. However, if the operational condition such as the thickness of the rolled material or the like is changed in the thus-arranged rolling process or the like, the inertia moment of the kinetic system of each of the motors or the like is changed. The above-described change leads to a fact that the rotational speeds of the motors become different from one another, causing the tension acting on the rolled material to be changed. Furthermore, the quality of the rolled material deteriorates and a problem of an excessive load trip arises in a portion of the motors. In order to prevent the above-described undesirable tension change, a necessity of establishing speed uniformity between the motors arises as an important factor.

Hitherto, in order to establish the above-described speed uniformity between motors, a method has been employed which is arranged in such a manner that each of the motors has, as the control characteristic thereof, a drooping characteristic, which corresponds to the load electric current, so as to absorb the set error or the like generated in the control system. Another method has been employed which is arranged in such a manner that the tension deviation is reduced by a tension control loop.

However, although a considerably satisfactory effect can be obtained from the above-described conventional methods in that the generated tension change can be reduced, there arises a problem in that the generation of the tension change cannot be prevented. A rolling line includes rolls such as the deflector rolls which must be rotated together with the material to be rolled. However, undesirable slip will take place between the roll and the material to be rolled or an excessively large load will act on the motor due to the change in the line speed or the tension change.

The above-described tension change can be prevented by adjusting the control gain such as the proportional gain of each of the motors and/or the control parameter such as an integral time constant in accordance with the change in the operational condition. Furthermore, the above-described slip and the excessively large load can be prevented by adjusting the limit value of the load current to be applied to the motor. However, any one of the conventional structures has not meet the above-described requirements. In addition, the above-described problems are taken place commonly to the other process lines, causing a problem to arise in that the change in the operational state of each of the process machines due to the change in the operation cannot be prevented.

On the other hand, if the setting of the control parameter for each of the motors is changed to correspond to the operational condition, a structure must be arranged in such a manner that the change in the operational condition in the process is detected by the plant controller, the control parameter for each of the motors is calculated in accordance with the above-described detection and the result of the calculation is transmitted to each of the motor controllers so that the setting of the control parameter is changed.

However, if a plurality of control parameters relating to the change in the setting are serial-transmitted by a conventional method (for example, a method disclosed in Japanese Patent Laid-Open No. 58-175991), the number of words to be transmitted increases by the quantity which corresponds to the plurality of the control parameters. In this case, the following problems take place in that: first, the receiving portion of the motor controller must have hardware such as serial-to-parallel converters and decoders of the number of words which correspond to the transmission format used to perform the serial transmission. Therefore, the overall structure becomes too complicated, causing the overall cost to be raised. Another problem arises in that, in a case where the number of the control parameters to be changed increases or the type of the control parameter is changed in accordance with the change in the control system, the structure cannot be easily changed to adapt to the above-described change.

What is even worse, the time required to complete the transmission operation becomes too long by the degree which corresponds to the increase in the number of words, causing the high speed response in the control operation to be deteriorated. That is, although the speed control system and the current control system must possess high speed response characteristics to correspond to the loading state which dynamically changes, the lengthened transmission time causes the period for transmitting the control command to be elongated and thereby the high speed response characteristic is deteriorated.

SUMMARY OF THE INVENTION

A first object of the present invention is to provide a motor control system for a process plant capable of preventing an abnormal operation of process machines due to change in the operational condition by arranging the structure in such a manner that the setting of the control parameter for motors can be changed by a plant controller in accordance with the change in the operational condition and the process machines can be controlled in synchronization with the change in the operational condition.

A second object of the present invention is to provide a motor control system for a process plant in which a command of changing the setting of the control parameter can be transmitted from the plant controller to the motor controller by the minimized number of words.

In order to achieve the above-described first object, according to one aspect of the present invention, there is provided a motor control system including a motor controller for controlling a motor for driving a process machine and a plant controller for controlling the motor controller and arranged in such a manner that the plant controller generates a command to control the motor in accordance with the operational condition of a process plant and transmits the control command to the motor controller and the motor controller has control characteristics defined by the set value of at least one control parameter and controls the motor in accordance with the control command supplied from the plant controller, the motor control system being characterized in that:

the plant controller calculates the updated value of the control parameter of the motor controller in accordance with the change in the operational condition of the process plant and transmits the updated value of the control parameter to the motor controller, and the motor controller updates the set value of the control parameter in accordance with the updated value of the supplied control parameter.

In order to achieve the above-described second object, according to another aspect of the present invention, there is provided a motor control system including a plurality of motor controllers for respectively controlling a plurality of motors for respectively driving a plurality of process machines and a plant controller for collectively controlling the plurality of motor controllers and arranged in such a manner that the plant controller includes a plurality of control command generating means for generating commands for controlling the motors in accordance with the operational condition of the process plant and transmission means for transmitting data including the control commands to the motor controllers via transmission passages and each of the motor controllers includes receiving means for receiving the data supplied from the plant controller via the transmission passages and control means having controlling characteristics defined by a set value of at least one control parameter and acting to control the motors in accordance with the control commands received, the motor control system being characterized in that:

the plant controller includes control parameter calculating means for calculating the updated value of a control parameter for at least one of the motor controllers in accordance with a change in the operational condition of the process plant and parameter updating command means for transmitting the updated value of the control parameter to the corresponding motor controller via the transmission means, The transmission means serial-transmits the data in accordance with a predetermined transmission format, the parameter updating command means transmits the updated value of the control parameter and a parameter code denoting the type of the control parameter to the transmitting means while allocating them to predetermined bits in one word of the transmission format, the motor controller includes parameter updating means for updating the set value of the control parameter in accordance with the updated value of the received control parameter, the receiving means transmits the parameter code and the updated value to the control parameter updating means after dividing them in accordance with the transmission format, and the control parameter updating means updates the set value of the control parameter which corresponds to the parameter code in accordance with the updated value.

Since the structure is arranged as described above, the above-described objects can be achieved by the motor control system according to the present invention because of the following operations:

First, the above-described plant controller calculates the updated value of the control parameter for each of the motor controllers in accordance with the change in the operational condition of the process plant. Each of the motor controllers updates the set value of the control parameter in accordance with the updated value of the control parameter. Therefore, the motors for the corresponding process machines are synchronously controlled in accordance with the control characteristics which have been changed to correspond to the above-described change in the operational condition. As a result, the abnormal operation of the process machine such as the change in the tension acting on the rolled material or the like due to the change in the operational condition, for example, the change in the thickness of the rolled material can be prevented.

It is preferable that the above-described process of updating the parameter be performed at a timing at which the above-described change in the operational condition effects on the process machines.

The control parameter includes at least any one of a control gain such as a proportional gain and an integration gain of a motor control system, a limited current value for the motor and a set inertia moment for a motor kinetic system.

In a case where the present invention is applied to a rolling mill plant including a rolling line or a line for annealing a rolled material, the control can be performed to correspond to the change in at least one operational condition such as the type of the rolled material, the thickness and the weight. For example, in a case of a helper roll in an annealing plant, it is preferable that the structure be arranged in such a manner that the proportional gain of the speed control system is changed to correspond to the change in the inertia moment of the kinetic system of the motor for driving the helper roll and the change in the inertia moment is absorbed. In a case of a deflector roll in a rolling mill plant, it is preferable that the structure be arranged in such a manner that the upper and lower limits of the electric current to be supplied to the motors, which are the control parameters, are changed in accordance with the operational condition so that the slip or the like is prevented.

On the other hand, according to another aspect of the present invention, the updated value of the control parameter is, together with the parameter code which denotes the type of the control parameter, transmitted while being allocated to predetermined bits in one word of the transmission format. Furthermore, the type of the control parameter, which corresponds to the received parameter code, is discriminated by the motor controller so as to update the set value of the control parameter in accordance with the updated value. Therefore, updated values of a plurality of different control parameters can be transmitted by transmitting/receiving means corresponding to one word. As a result, the change of the plurality of control parameters can be made with the minimized number of words. Furthermore, the transmitting/receiving means can be constituted simply by increasing one word of hardware such as the serial-to-parallel converter and the decoder. Therefore, the overall cost can be reduced. Furthermore, if the number of the control parameters to be changed is increased or the type of the control parameter is changed when the control system has been changed, a suitable system can easily be constituted simply by changing the software in such a manner that, for example, the parameter code is added or the same is changed.

In a case where a plurality of control parameters are required to be updated, each control parameter is stored in the transmission format in every transmission period so as to be sequentially transmitted.

Other and further objects, features and advantages of the invention will be appear more fully from the following description.

BRIEF DESCRIPTION OF THE DRAWINGS

FIG. 10 is a structural view which illustrates the specific structure of the receiving portion according to the embodiment shown in FIG. 9;

FIG. 11 is a block diagram which illustrates the specific structure of the speed control system according to the embodiment shown in FIG. 7;

DETAILED DESCRIPTION OF THE PREFERRED EMBODIMENTS

Figure 1:
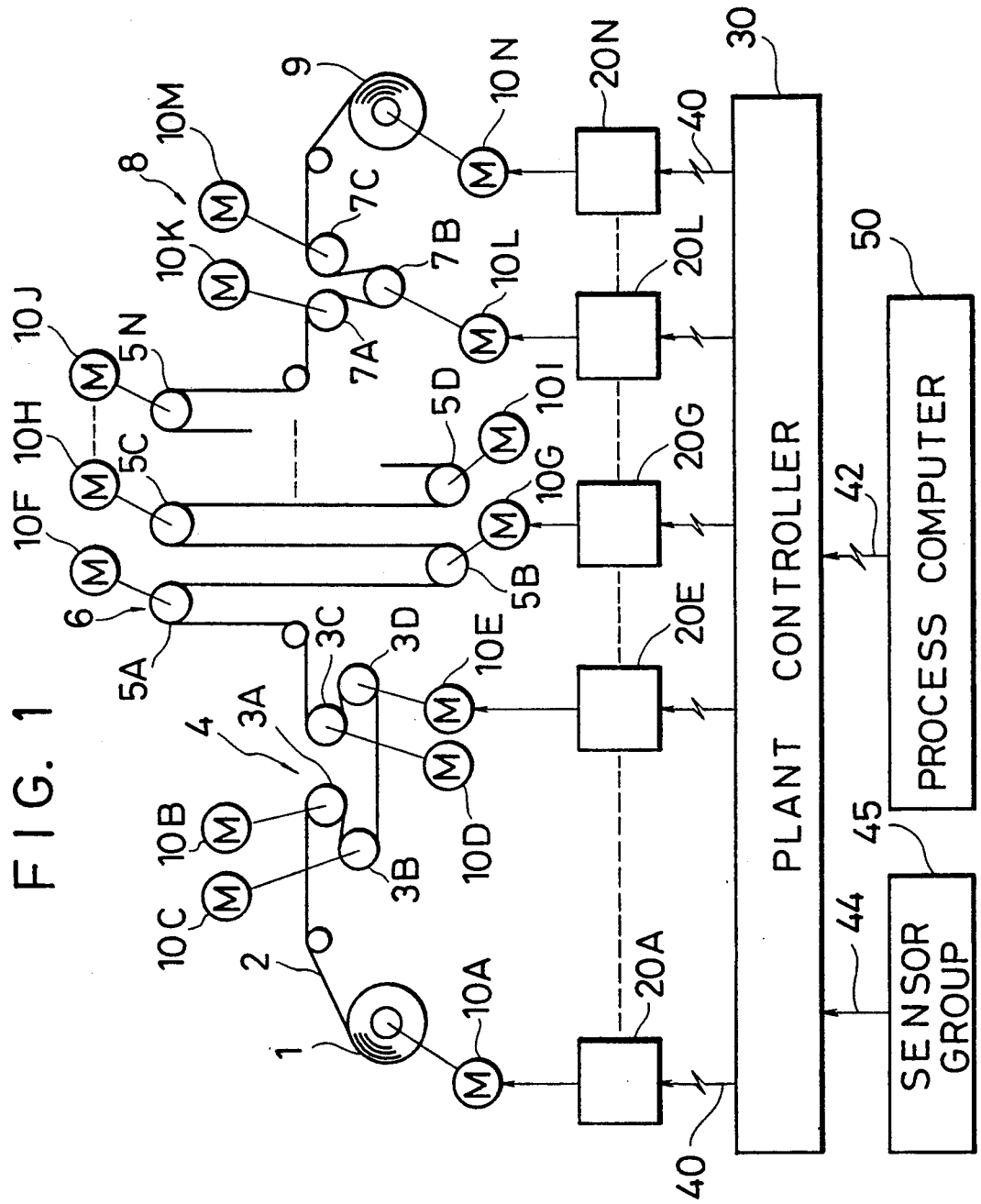
FIG. 1 is an overall structural view which illustrates a motor control system for an annealing plant according to an embodiment of the present invention.

Preferred embodiments of the present invention will now be described with reference to the drawings. FIG. 1 illustrates the overall structure of a system for controlling a motor provided for a line for annealing a rolled material according to an embodiment of the present invention. FIGS. 2 to 8 respectively are detailed structural views which illustrate each element. The annealing line according to this embodiment is arranged in such a manner that a rolled material 2 rewound by a rewinder 1 is introduced into an annealing apparatus 6 including a plurality of helper rolls 5A to N via an input-side bridle roll group 4 comprising a plurality of bridle rolls 3A to D. The rolled material 2 thus-introduced is annealed in the annealing apparatus 6 before it sequentially passes through an output-side bridle roll group 8 comprising a plurality of bridle rolls 7A to C, the rolled material 2 being then wound up by a winder 9. The rewinder 1 is driven by a motor 10A, the input-side bridle rolls 3A to D are driven by motors 10B to E, the helper rolls 5A to N are driven by motors 10F to J, the output-side bridle rolls 7A to C are driven by motors 10K to M and the winder 9 is driven by a motor 10N.

In order to maintain the tension of the rolled material at a constant value at each of the portions in terms of maintaining the quality and performing the operation safely on the annealing line thus-constituted, the most important factor is to achieve the speed uniformity in the speed response of the motors 10. In particular, when the operational conditions such as the plate thickness of the rolled material and the material or the like is changed, the inertia moment acting on the kinetic system of each motor 10 is changed. In inverse proportion to the above-described change, the speed response is changed. That is, since the ratio of change in the inertia moment due to the change in the material or the like is different in each of the motors, the speed response of each of the motor controllers varies. Therefore, in order to achieve the speed uniformity in the speed response, the control characteristics of each of the motors must be adjusted to correspond to the operational condition change. Then, the motor control system according to this embodiment capable of overcoming the above-described requirement will now be described.

The motors 10A to N are respectively controlled by a plurality of motor controllers 20A to N disposed correspondently or disposed in such a manner that the motor controllers 20A to N form a predetermined number of groups. In order to simplify the illustration, a portion of motor controllers is omitted from the illustration. The motor controllers 20A to N receive control commands such as a drive stop command, a speed command, a torque command and control data including control parameters or the like issued from a plant controller 30 via a transmission passage 40. Furthermore, information required for the plant controller 30 can be transmitted from the motor controllers 20A to N. In addition, actual information for required process machines is supplied to the plant controller 30 from each of sensor groups 45. Furthermore, the plant controller 30 is connected to a host process computer 50.

The process computer 50 outputs various operational commands to the plant controller 30 in accordance with the operational condition and the actual operational information obtained from the plant controller 30. The plant controller 30 generates commands to control the speed of each of the motors 10, the electric current to be supplied to the same or the like in accordance with the given operational command so as to transmit them to each of the motor controllers 20. At this time, the plant controller 30 discriminates the operational state in accordance with the actual operational information supplied from the sensor group 45 and the operational information supplied from each of the motor controllers 20. The motor controllers 20A to N control the corresponding motors 10 in accordance with the control command supplied from the plant controller 30.

Figure 2:
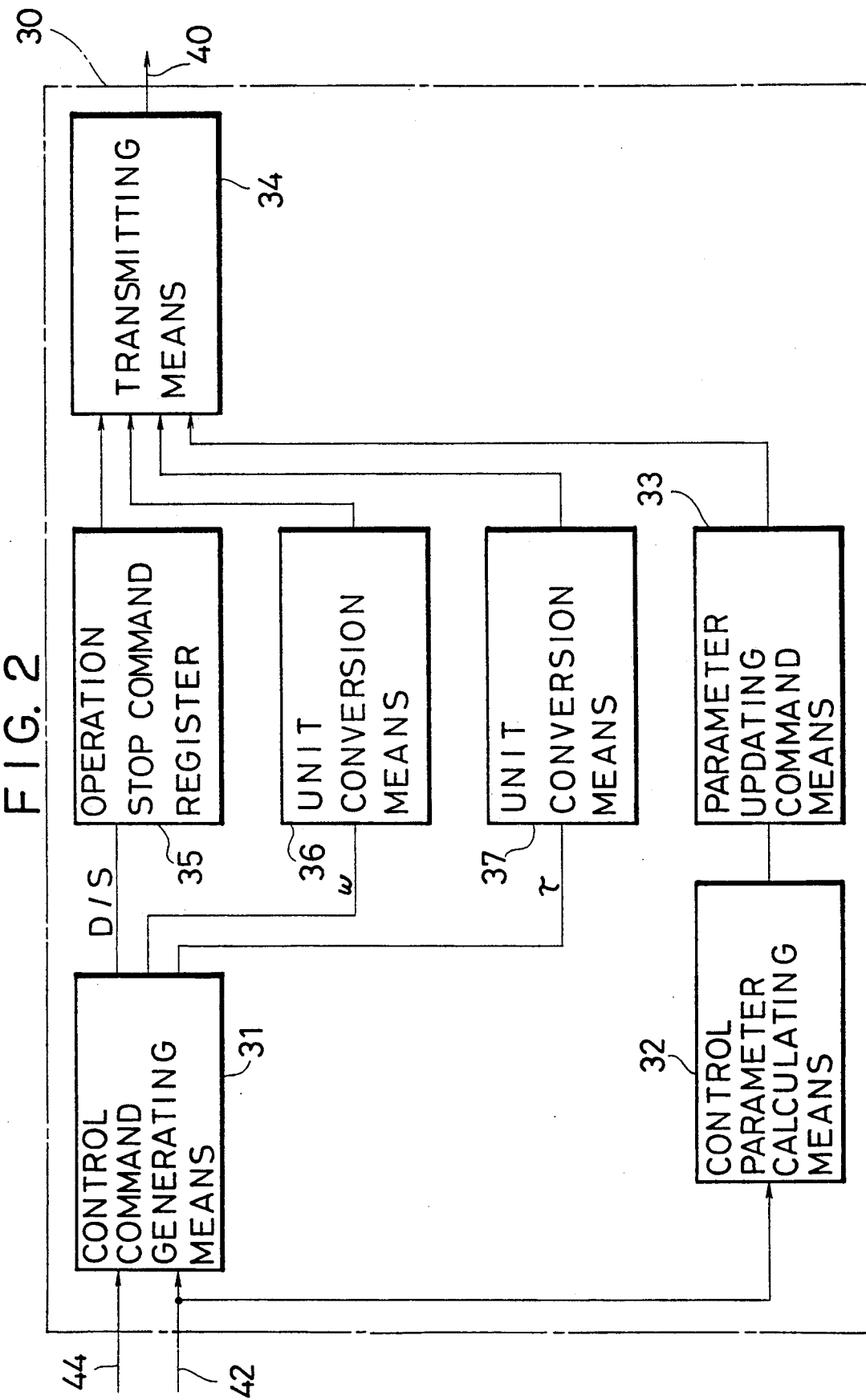
FIG. 2 is a structural view which illustrates a plant controller according to the embodiment shown in FIG. 1.
Figure 3:
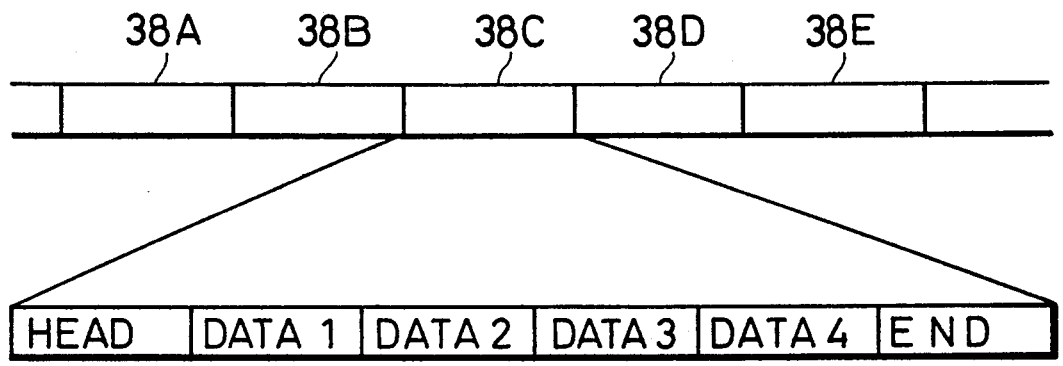
FIG. 3 is a structural view which illustrates a serial transmission frame.
Figure 4:
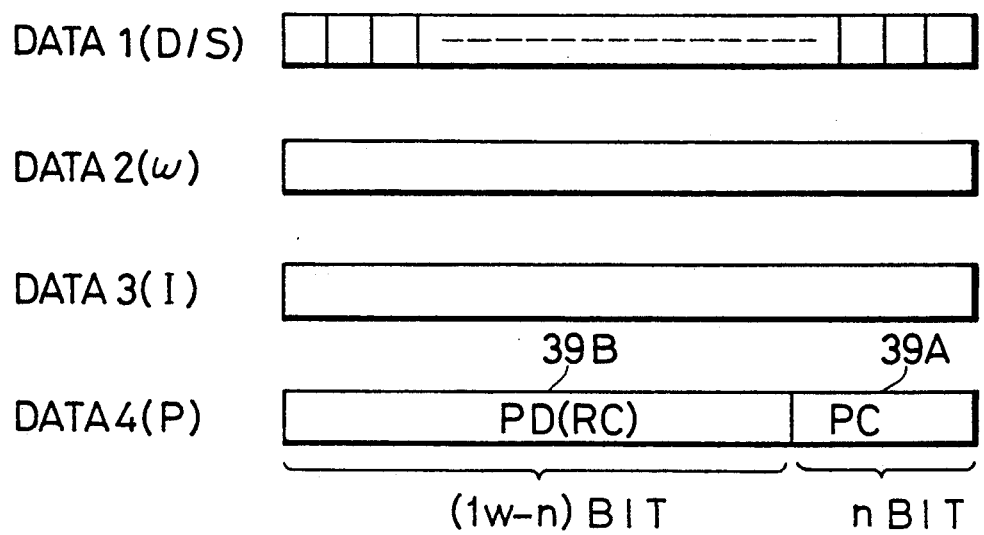
FIG. 4 is a structural view which illustrates data to be transmitted.
Figure 5:
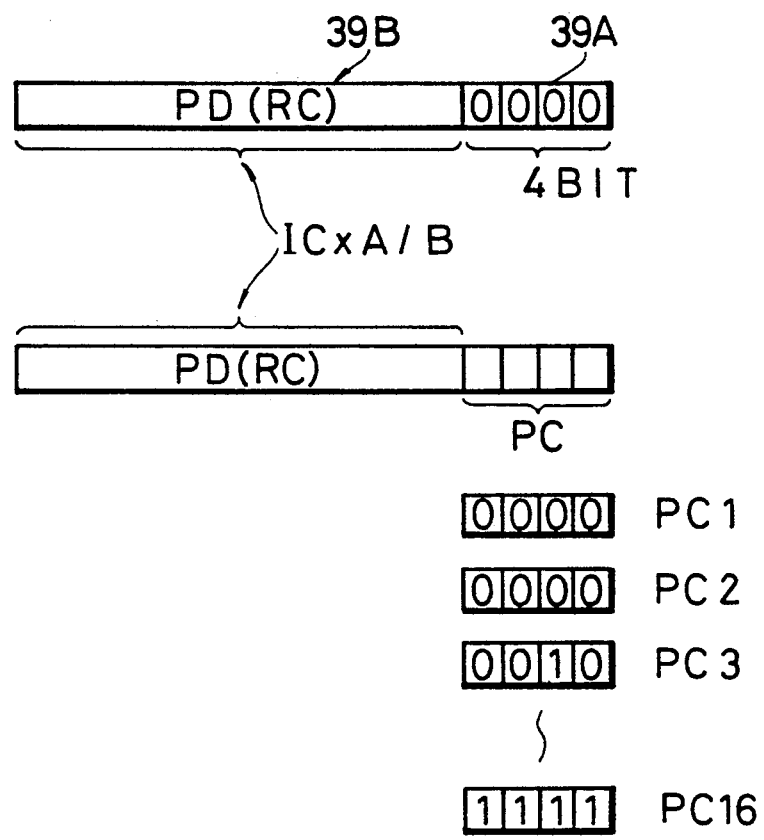
FIG. 5 is a bit structural view which illustrates a command of changing a control parameter.

FIG. 2 is a block diagram which illustrates an essential portion of the plant controller 30. As shown in FIG. 2, the plant controller 30 comprises a control command generating means 31, a control parameter calculating means 32, a parameter updating command means 33 and a transmitting means 34. The control command generating means 31 generates a command to control the corresponding motor 10 in accordance with the operational condition and the operation command supplied from the process computer 50 via the transmission passage 42. The generated control command is transmitted to the corresponding motor controller 20 via the transmitting means 34. According to this embodiment, motor drive stop command D/S is received by the transmitting means 34 via a drive stop register 35, speed command $\omega$ is received by the same after it has been converted by a unit conversion means 36 from unit "mpm" for the speed system of the rolled material into unit "rpm" for the speed system of the motor, torque command $\tau$ is received by the same after it has been converted by a unit conversion means 37 from unit [N·m] for the mechanical system into electric-current command I in electric current unit [A] for the motor. The control parameter calculating means 32 calculates the updated value of the control parameter for the motor in accordance with the supplied operational condition in a predetermined manner to be described later so as to output updated values of one or more control parameters to meet a requirement to the parameter updating command means 33. The parameter updating command means 33 adds the parameter code which corresponds to the type of the control parameter, the value of which has been updated, to the updated value so as to transmit the result of this addition to the above-described transmitting means 34. The transmitting means 34 according to this embodiment are individually provided to correspond to the motor controllers 20A to N so as to transmit data to each of the motor controllers through a so-called radial transmitting passage. However, the present invention is not limited to this. A structure may be employed which is arranged in such a manner that the motor controllers 20A to N are connected to one another by a loop transmission passage to transmit data through the above-described loop-like transmission passage. The transmitting means 34 generates transmission data 38 (A, B,...) for one frame from the above-described each command in accordance with a transmission format shown in FIG. 3, the transmission data 38 being continuously output to any one of the corresponding motor controllers 20A to N for every constant transmission period. The above-described transmission data 38 for one frame includes, for example, 6 words as illustrated, among which head data HEAD and end data END for controlling the transmission are respectively allocated to head and end words. The head data HEAD denotes the head portion of the transmission data 38, while end data END includes data denoting the end of the transmission data 38 and error check data. Four words placed at the intermediate portion between the head and end words, control data DATA 1 to 4 are allocated. For example, the above-described drive stop command D/S, the speed command $\omega$, the electric-current command I and the control parameter updating command P are respectively allocated to DATA 1 to 4 as shown in FIG. 4. The bits of the control parameter updating command P is constituted in such a manner that it is divided into a parameter code portion 39A constituted by n bits (n = 1, 2, 3,...) and a control parameter data portion 39B constituted by (1w−n) bits. FIG. 5 illustrates the bit structure of the control parameter updating command P in a case where 1w = 16 bits and n = 4 bits. In this case, the control parameter data portion 39B is 12 bits so that it is able to express −2048 to +2047 control parameters. Therefore, in a case where the control gain is changed, control parameter PD can be changed in a range between −20.48 to +20.47 times assuming that integer conversion coefficient IC is 0.01, that is, two decimal places are significant figure. As a result, the change in the control gain thus-realized is satisfactorily able to correspond to a usual change in the control parameter. On the other hand, since there are four bits in the parameter code portion 39A, 16 types of parameter codes PC can be set.

Figure 6:
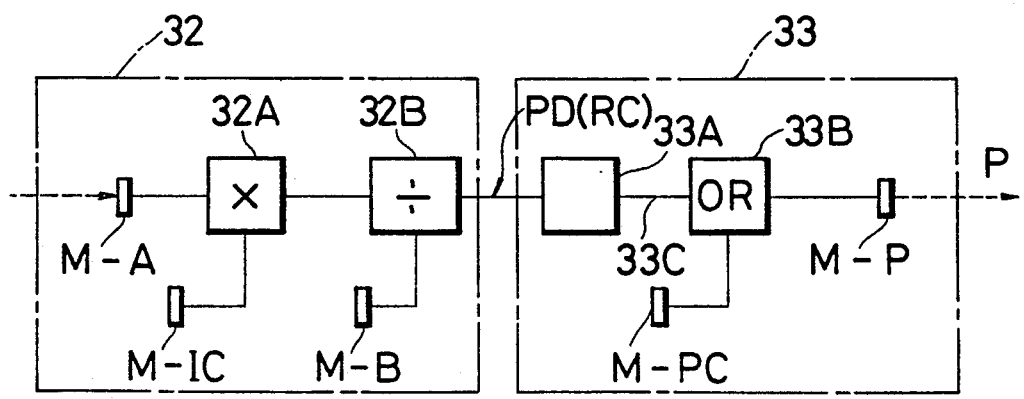
FIG. 6 is a block diagram which illustrates a specific structure of a control parameter calculating means and a parameter updating command means for a plant controller.

The specific structure of the control parameter calculating means 32 for generating the above-described control parameter updating command P and that of the parameter updating command means 33 are shown in FIG. 6. As shown in FIG. 6, the control parameter calculating means 32 read out present operational condition A stored in memory address M-A, for example, present value A of the inertia moment acting on the motor. A multiplier 32A multiplies the integer conversion coefficient IC stored in memory address M-IC so as to convert the decimal of the inertia moment A into an integer having required significant figure by shifting the position of the decimal. The above-described integer conversion coefficient IC varies depending upon the decimal places to which the significant figure is set. For example, if a significant figure to 0.01 is required, a setting is made that IC = 100. Then, a subtraction is, in a subtracter 32B, made in such a manner that the output from the multiplier 32A is subtracted by initial value B of the operation condition stored in memory address M-B, the result of the subtraction being made to be updated coefficient RC (= IC×A/B) of the control parameter so as to be transmitted to the parameter updating command means 33. That is, an arrangement is made in such a manner that the updated value of the control parameter is updated with the updating coefficient RC expressed by the ratio with respect to the initial set value. The updating coefficient RC supplied to the parameter updating command means 33 is, by a bit shifter 33A, subjected to an operation in which the bit is shifted upwards by n bits as described with reference to FIG. 5 so as to create a space in the parameter code portion 39A. Then, the predetermined parameter code PC stored in the memory address M-PC is stored in the above-described parameter code portion 39A through the OR gate 33B. The parameter code PC thus-stored is made to be the parameter updating command P so as to be transmitted to the corresponding motor controller 20 via the transmitting means 34.

Figure 7:
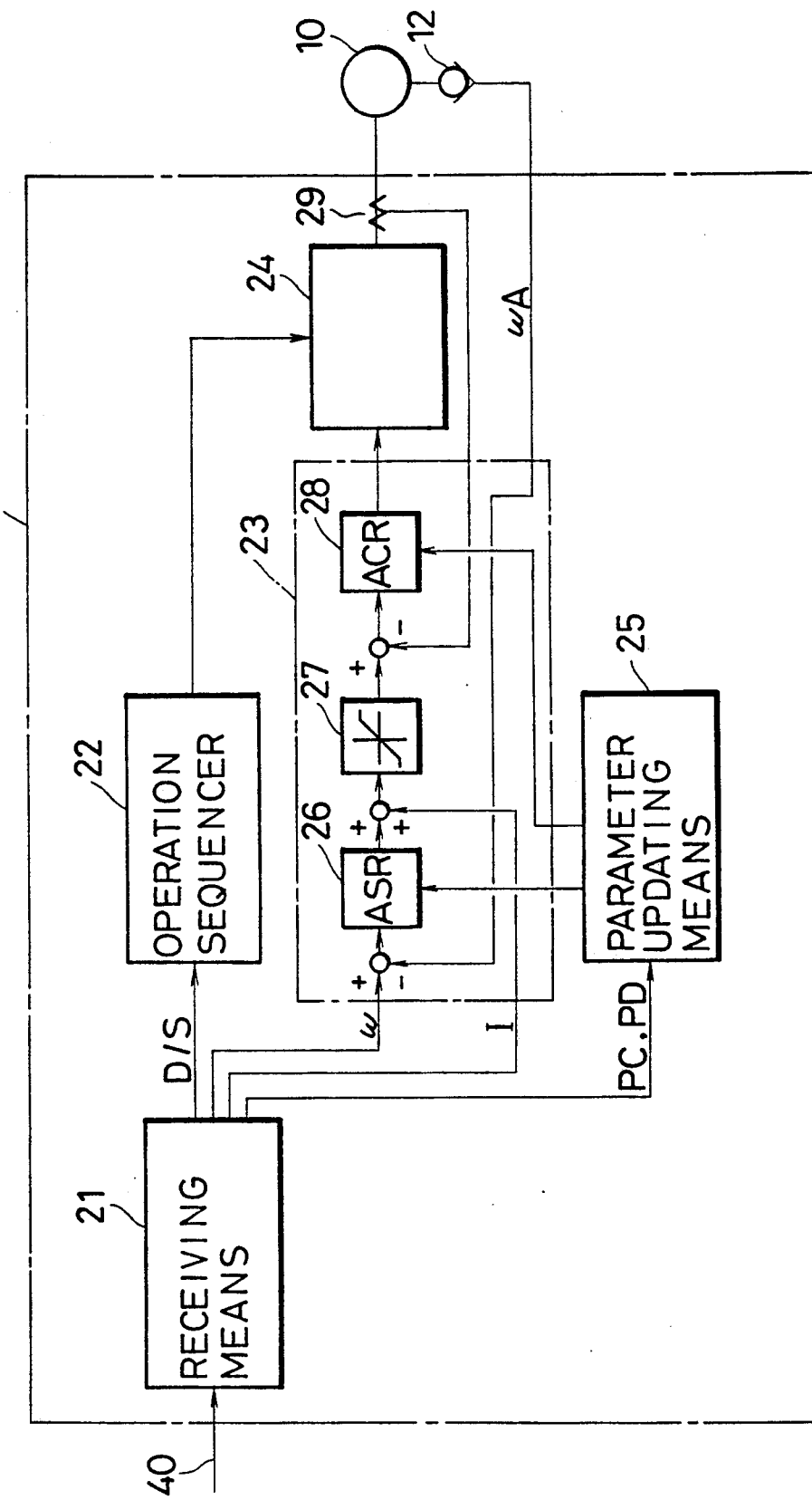
FIG. 7 is a structural view which illustrates a motor controller according to the embodiment shown in FIG. 1.

Then, referring to FIG. 7, the block structure of an embodiment of the motor controller 20 will now be described. The motor controller 20 comprises a receiving means 21, a drive sequencer 22, a control means 23, a parameter updating means 25 and a power converter 24 such as an inverter. The receiving means 21 fetches control data supplied via the transmission passage 40 so as to decode it in accordance with the above-described transmission format. As a result, the drive stop command D/S is transmitted to the drive sequencer 22, the speed command $\omega$ and the electric-current command I are transmitted to the control means 23 and the parameter updating command P is transmitted to the parameter updating means 25. The drive sequencer 22 mainly controls the operation of the power converter 24 in accordance with the contents of the control made by means of the drive stop command D/S. According to this embodiment, the control means 23 comprises a speed control system ASR26, a current limiter 27 and a current control system ACR28. The speed control system ASR26 proportional-plus-integrates the deviation between the supplied speed command $\omega$ and actual speed $\omega A$ supplied from a speed detector 12 of the motor 10 and as well as outputs an electric current command with which the above-described deviation is enabled to be zero. The current limiter 27 fetches the result of an addition of the electric-current command I supplied from the plant controller 30 and the electric-current command transmitted from the speed control system ASR26 so as to output it while limiting it within the upper and the lower limits for the electric current, if necessary. The current control system ACR28 generates an output voltage command to be supplied to the power converter 24 for the purpose of making the deviation between the electric current command transmitted from the current limiter 27 and the actual current supplied from the current detector 29 to be zero. The power converter 24 is therefore accurately operated in accordance with the supplied output voltage command to control the speed of the motor 10.

Figures 8, 9:
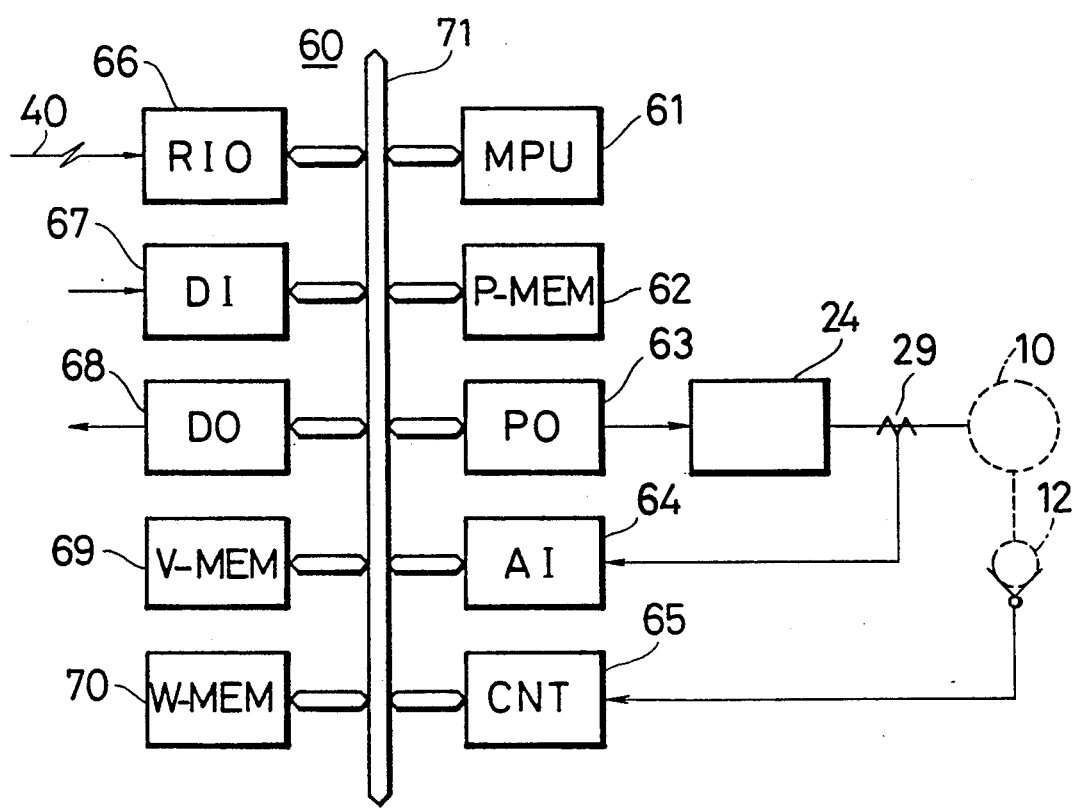
FIG. 8 is a collation table between the parameter codes and the types of the control parameters.
FIG. 9 is a structural view which illustrates an embodiment in which the motor controller is constituted by a microcomputer.

On the other hand, the parameter updating means 25 has a collation table between the parameter code PC and the types of the control parameters as shown in FIG. 8 so as to retrieve the collation table in accordance with the supplied parameter code PC so as to specify the corresponding type of the control parameter. The updated value PD of the supplied control parameter is transmitted to the control system which corresponds to the specified control parameter so that the control parameter which has been specified up to the present is updated. For example, if the specified parameter type is ASR Proportional Gain K1, proportional gain K1 of the speed control system ASR26 is updated (see FIG. 11). As a result, the change in the inertia moment or the like due to the change in the operational condition can be compensated. Therefore, the speed uniformity of the motors 10 can be maintained by the realized speed response even if the change in the plate thickness or the like of the rolled material has taken place.

Then, an embodiment will now be described which is arranged in such a manner that the above-described motor controller 20 is constituted by a microcomputer as shown in FIG. 9. Furthermore, a specific embodiment of the process of updating the control parameter will now be described with reference to FIGS. 10 to 12. FIG. 9 illustrates the portion which corresponds to the portion shown in FIG. 7. The motor controller 20 shown in FIG. 7 is constituted by a microcomputer 60 except for the power converter 24 and the current detector 29. The microcomputer 60 comprises a microprocessor MPU 61, a program memory P-MEM62, a pulse output portion PO63, an analog input portion AI64, a counter CNT65, a receiving portion RI066, a digital input portion DO68, a control constant memory V-MEM69, a working memory W-MEM70 and a data/control bus 71 which connects the above-described elements. The microprocessor 61 commences the operation of MPU 61 by supplying the control power supply source or by performing a general resetting process so as to perform the operations in accordance with the program stored in MEM62. The receiving portion RI066 is constituted as shown in FIG. 10. The pulse train of supplied control data to be serially transmitted is fetched while being insulated by an insulated transformer 81. The fetched control data is converted into parallel data by a serial-to-parallel converter 82. The control data formed into the parallel data is, by a decoder 83, divided into DATA1 to 4 as shown in FIG. 4 before they are stored in a register 84. The above-described data DATA 1 to 4 are read out by the MPU61 if necessary so as to be used to control the motor 10. For example, a drive stop command is issued from the PO63 to the power converter 24 in accordance with the drive stop command D/S, while the speed command $\omega$ and the electric current command I are fetched into the calculation process which forms the above-described control means 23. The control block diagram for the ASR26 which constitutes the control means 23 is shown in FIG. 11. Control data required to perform the control calculation is read from a predetermined address of the work memory W-MEM70. The speed command $\omega$ is stored in address M111, the speed signal detected by the speed detector 12 is obtained by the counter CNT65 as the actual speed $\omega A$ so as to be stored in address M112, ASR integral time constant TN is stored in address M151 and the ASR Proportional Gain K1 is stored in address M121. The integral time constant TN and the proportional gain K1 are, to be described later, reloaded to an updated value at any time in accordance with the change in the operational condition. Then, the deviation between $\omega$ and $\omega A$ is calculated by an adder 26A, the deviation being integrated by a proportional integration means composed of an integrator 26B and an adder 26C in accordance with the integration time constant TN. The proportional gain K1 is multiplied by a multiplier 26D so that electric current command IS for the motor is generated. The electric current command IS is stored in address M113 so as to serve as a command for the above-described current control system 28 as the above-described current limiter 27. Symbol s of the integrator 26B represents an operator. In the current control system 28, the command value for the output voltage from the power converter 24 is obtained in accordance with the deviation between the result of the addition of the electric current commands IS and I and the actual current IA fetched from the AI64, the command value thus-obtained being then transmitted to the power converter 24 via the PO63. As a result, the motor 10 is driven in accordance with the speed control characteristics of the speed control system 26 determined in accordance with the integration time constant TN and the proportional gain K1.

Figure 12:
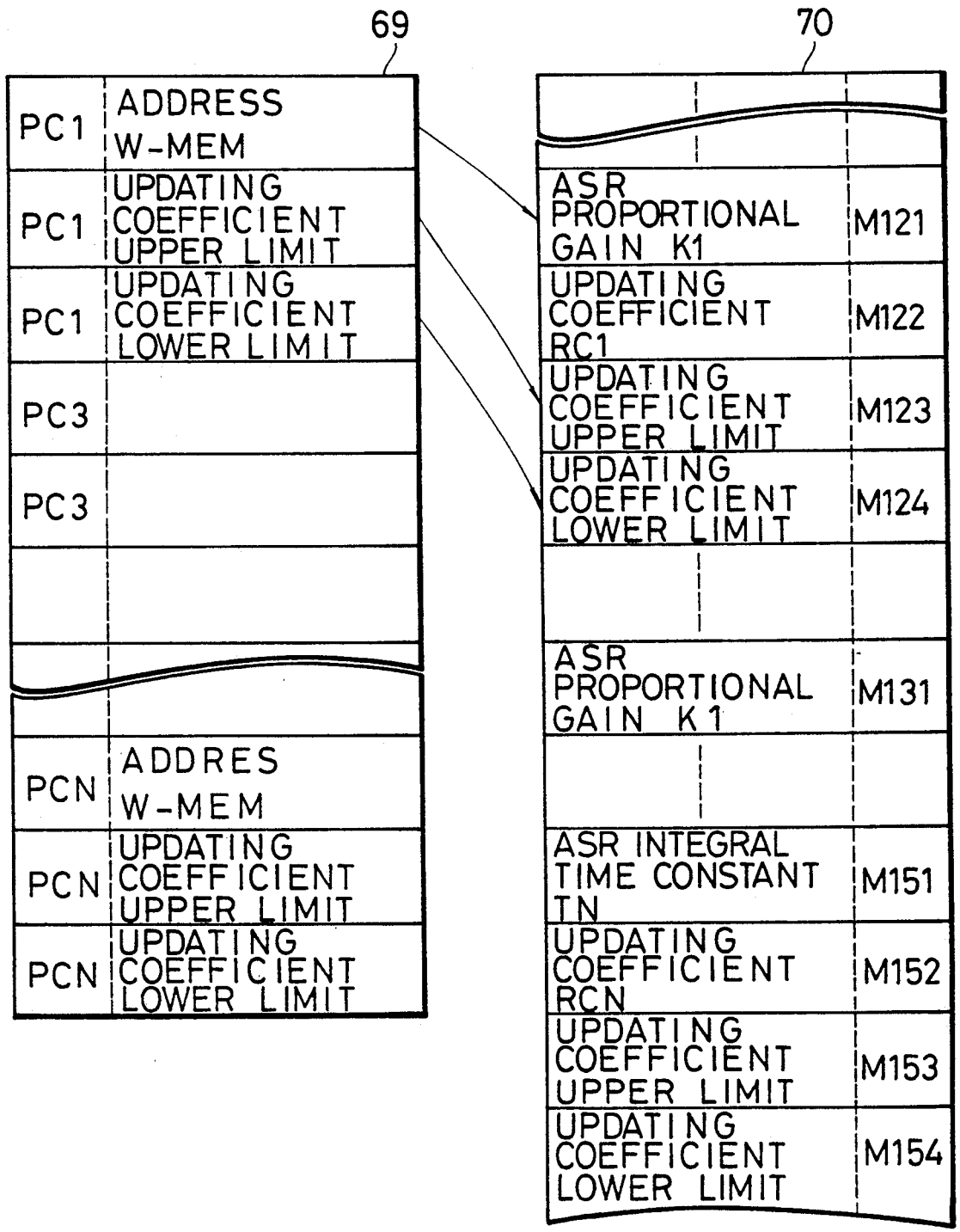
FIG. 12 illustrates a portion of a control parameter memory and a working memory.

Then, the sequence of updating the proportional gain K1 in accordance with the above-described inertia moment which is changed due to the change in the operational condition will now be described with reference to V-MEM69 and W-MEM70 shown in FIG. 12. The V-MEM69 previously stores a variety of established data about at least the parameters to be updated in accordance with the operational condition among the control parameters PD which relate to the control of the subject motor. Referring to FIG. 12, parameter codes PC1, PC3 of the control parameter to be updated and W-MEM address of PCN, the upper limit value RCH of the updating coefficient and the lower limit value RCL of the updating coefficient are stored. The motor controller 20 initializes the control parameter PD to be updated in accordance with the V-MEM69 as follows at the time of the system start so as to store the initialized content in the W-MEM70.

(1) The W-MEM address, the upper limit value RCH of the updated coefficient and the lower limit value RCL of the same are read out from the V-MEM69 for each control parameter PD to be updated.

(2) The present content of the read W-MEM address is temporarily retracted in another address. For example, the ASR Proportional Gain K1 is retracted in anther address M131.

(3) The upper limit value RCH of the updated coefficient and the lower limit value RCL of the same read out are stored in predetermined addresses.

(4) An initial value (usually set to 100 %) is stored in the address of the updating coefficient RC.

(5) All of the control parameters PD to be updated are sequentially subjected to the above-described initializing processes (1) and (2).

The process of updating the control parameter PD performed by the parameter updating means 25 is performed in accordance with the following sequence.

(11) The rationality of the supplied parameter code PC is checked so that the data is protected from destruction due to an erroneous updating operation.

(12) The W-MEM address of the control parameter PD, which corresponds to the supplied parameter code PC, is obtained from the V-MEM69. Then, in accordance with the obtained V-MEM69, the W-MEM address of the updating coefficient RC is obtained.

(13) Then, the supplied updating coefficient RC is subjected to comparisons with the upper limit value RCH of the updating coefficient and the lower limit value RCL of the same so as to check the rationality. If it is included in the above-described range defined by the upper and lower limits, it is stored in the address of the W-MEM which has been obtained as described above. If it is not included in the range defined by the same, it is deleted as erroneous data.

(14) Then, the control parameter PD to be updated and retracted in process (2) is multiplied by the updating coefficient RC so as to use it as the control parameter PD after the updating operation, the control parameter PD being then stored in a predetermined address.

For example, K1 of the address M131 is multiplied by the updating coefficient RCI of the address M122 and the result of this multiplication is stored in the address M121 as the control parameter K1 after updating. As a result, the proportional gain K1 of the control means 26 as shown in FIG. 11 can be updated.

As described above, the control parameter PD for use to control the motor can be updated in accordance with the control parameter updating command P transmitted from the plant controller 30. Therefore, the characteristics for controlling the motor can always be compensated to the most suitable characteristics which correspond to the change in the operational condition. For example, even if the inertial moment acting on each of the motors is changed due to the change in the thickness of the rolled material, the speed response characteristics are compensated to absorb the above-described change. Therefore, the speed uniformity can be maintained between the motors and therefore the abnormal operation such as an operation in which the tension of the rolled material is changed can be prevented. That is, the motors for the corresponding process machines can be synchronously controlled to correspond to the change in the operational condition.

The above-described operation of updating the control parameter is performed whenever the control parameter change command P is supplied. Furthermore, the reloading of control parameter PD is performed to meet the timing at which each of the process machine corresponds to the abovedescribed operational condition change.

As the control parameter to be updated, the electric current limit value to be supplied to the motor or inertial moment for the motor kinetic system may be used as well as the proportional gain for the motor controller system and the control gain such as the integration time constant or the like.

According to the present invention, the structure is arranged in such a manner that the updating coefficient of the control parameter is transmitted while being allocated, together with the parameter code denoting the type of the control parameter, to a predetermined bits in one word of the transmission format. Furthermore, the motor controller 20 discriminates the type of the control parameter which corresponds to the received parameter code so as to perform the updating operation in accordance with the updating coefficient of the established value of the control parameter. Therefore, the transmitting/receiving means corresponding to one word is able to transmit the updated values of a plurality of different control parameters. As a result, plural types of control parameters can be updated by the minimum number of words. In addition, since the transmitting/receiving means can be constituted simply by increasing the hardware such as the serial-to-parallel converter and the decoder by one word, the overall cost can be reduced. Furthermore, if the number of the control parameters to be changed is increased or the type of the control parameter is changed when the control system has been changed, a suitable system can easily be constituted simply by changing the software in such a manner that, for example, the parameter code is added or the same is changed.

In a case where a plurality of control parameters are required to be updated, each control parameter is stored in the transmission format in every transmission period so as to be sequentially transmitted. In this case, each of the control parameters is updated one time in a plural transmission periods. However, there arises no problem because the change in the control parameter takes place relatively gradually in comparison to the speed command ω or the electric current command I. On the contrary, if the updating data about a plurality of control parameters is stored in one transmission frame, the length of the transmission frame is lengthened excessively and thereby the time required to complete the transmission becomes too long. As a result, the high speed response required in the control operation deteriorates.

Figure 13:
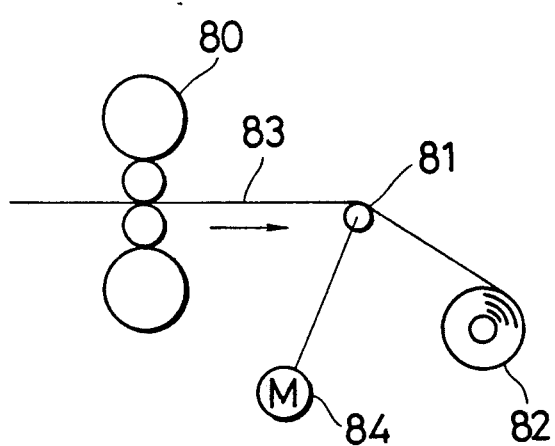
FIG. 13 illustrates an embodiment in which the present invention is applied to a deflector roll for a rolling mill plant.

Then, an embodiment arranged in such a manner that the motor control system according to the present invention is adapted to a deflector roll of a rolling plant shown in FIG. 13 will now be described. As shown in FIG. 13, a rolled material 83 rolled by a rolling mill 80 is arranged to be wound by a winder 82 via a deflector roll 81 disposed on the outlet side of the rolling mill 80. In this case, the deflector roll 81 must be operated at a speed which coincides with the speed at which the rolled material 83 is discharged. However, the two speed levels do not coincide with each other by a degree which corresponds to the error in the advancement ratio of the rolling mill 80. Since the above-described error takes place by about several percentages, the speed of the deflector roll 81 and that of the rolled material do not coincide with each other. As a result, a motor 84 is brought to an overload state due to the operation of the speed control system of the motor 84 for the deflector roll 81. Therefore, a trip takes place or a slip is generated between the deflector roll 81 and the rolled material 83. Accordingly, the limit value of the output torque of the deflector roll 81, which is defined by the type of the rolled material, is set so that the above-described overload and the trip are prevented. That is, the upper and lower limit values of the current limiter 27, as shown in FIG. 7, are set so as to be updated in accordance with the change in the material by the procedure of updating the control parameter arranged similarly to the above-made description.

As described above, the present invention is arranged in such a manner that the set control parameter for the motor can be changed by the plant controller in accordance with the change in the operational condition. Therefore, the process machines can be controlled in synchronization with the change in the operational condition. As a result, the abnormal operation of the process machine due to the change in the operational condition can be prevented.

Furthermore, the number of words required to transmit the setting change command for the control parameter from the plant controller to the controller of the motor can be minimized. That is, the updating coefficient of the control parameter is transmitted while being, together with the parameter code denoting the type of the control parameter, allocated to the predetermined bits in one word of the transmission format. The type of the control parameter, which corresponds to the received parameter code, is discriminated by the motor controller so that the set value of the control parameter is updated in accordance with the updating coefficient. As a result, the transmitting/receiving means corresponding to one word is able to transmit the updated values of a plurality of different control parameters. As a result, plural types of control parameters can be changed by the minimum number of words. In addition, since the transmitting/receiving means can be constituted simply by increasing the hardware such as the serial-to-parallel converter and the decoder by one word, the overall cost can be reduced. Furthermore, if the number of the control parameters to be changed is increased or the type of the control parameter is changed when the control system has been changed, a suitable system can easily be constituted simply by changing the software in such a manner that, for example, the parameter code is added or the same is changed.

In a case where a plurality of control parameters are required to be updated, each control parameter is stored in the transmission format in every transmission period so as to be sequentially transmitted.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A motor control system comprising:
a motor controller for controlling a motor for driving a process machine; and
a plant controller for controlling said motor controller, wherein
said plant controller includes control command generating means for generating a command for controlling said motor in accordance with a operational condition of a process plant, transmission means for transmitting data including said control command to said motor controller via a transmission passage, control parameter calculating means for calculating an updated value of a control parameter for said motor controller in accordance with a change in said operational condition of said process plant and parameter updating command means for transmitting said updated value of said control parameter to said motor controller via said transmission means, and
said motor controller includes receiving means for receiving said data supplied from said plant controller via said transmission passage, control means having controlling characteristics defined by a set value of at least one control parameter and acting to control said motor in accordance with said received control command and parameter updating means for updating said set value of said control parameter in accordance with said updated value of said control parameter.

2. A motor control system according to claim 1, wherein said control parameter includes at least one of a control gain including at least one of a proportional gain and an integration gain of the motor control system, a current value limit for said motor and a set inertia moment for a motor kinetic system.

3. A motor control system according to claim 1, wherein said parameter updating command means calculates a timing at which said change in said operational condition affects said process machine so as to transmit said updated value of said control parameter at said calculated timing.

4. A motor control system comprising:
a plurality of motor controllers for respectively controlling a plurality of motors for respectively driving a plurality of process machines; and
a plant controller for collectively controlling said plurality of motor controllers, wherein
said plant controller includes a plurality of control command generating means for generating commands for controlling said motors in accordance with an operational condition of a process plant, transmission means for transmitting data including said control commands to said motor controllers via transmission passages, control parameter calculating means for calculating an updated value of a control parameter for at least one of said motor controllers in accordance with a change in said operational condition of said process plant and parameter updating command means for transmitting said updated value of said control parameter to the corresponding motor controller via said transmission means, and each of said motor controllers includes receiving means for receiving said data supplied from said plant controller via said transmission passages, control means having controlling characteristics defined by a set value of at least one control parameter and acting to control said motors in accordance with said control commands received by said receiving means and parameter updating means for updating said set value of said control parameter in accordance with said updated value of said control parameter.

5. A motor control system according to claim 4, wherein said parameter updating command means calculates a timing at which said change in said operational condition affects said process machines so as to transmit said updated value of said control parameter at said calculated timing.

6. A motor control system comprising:
a plurality of motor controllers for respectively controlling a plurality of motors for respectively driving a plurality of process machines which constitute a rolling mill plant having at least one of a rolling line and a line for annealing a rolled material; and a plant controller for collectively controlling said plurality of motor controllers, wherein said plant controller includes a plurality of control command generating means for generating commands for controlling said motors in accordance with an operational condition of said rolling mill plant, transmission means for transmitting data including said control commands to said motor controllers via transmission passages, control parameter calculating means for calculating an updated value of a control parameter for at least one of the type, the thickness, and the weight of said rolled material, and parameter updating command means for transmitting said updated value of said control parameter to the corresponding motor controller via said transmission means, and each of said motor controllers includes receiving means for receiving said data supplied from said plant controller via said transmission passages, control means having controlling characteristics defined by a set value of at least one control parameter and acting to control said motors in accordance with said control commands received by said receiving means and parameter updating means for updating said set value of said control parameter in accordance with said updated value of said control parameter.

7. A motor control system according to claim 6, wherein said parameter updating command means calculate a timing at which said change in said operational condition affects said process machines so as to transmit said updated value of said control parameter at said calculated timing.

8. A motor control system according to claim 6, wherein said process machines include a plurality of helper rolls for said line for annealing said rolled material and said control parameter for said motor controller for each of said helper rolls is a control gain capable of absorbing a change in the inertia moment of a motor kinetic system due to the change in the at least one of the type, the thickness, and the weight of said rolled material.

9. A motor control system according to claim 6, wherein said process machines include a deflector roll for said rolling line and said control parameter for said motor controller for said deflector roll includes upper and lower limits of an electric current to be supplied to said motor.

10. A motor control system comprising:
a plurality of motor controllers for respectively controlling a plurality of motors for respectively driving a plurality of process machines; and a plant controller for collectively controlling said plurality of motor controllers, wherein said plant controller includes a plurality of control command generating means for generating commands for controlling said motors in accordance with an operational condition of a process plant, transmission means for transmitting data including said control commands to said motor controllers via transmission passages, control parameter calculating means for calculating an updated value of a control parameter for at least one of said motor controllers in accordance with a change in said operational condition of said process plant and parameter updating command means for transmitting said updated value of said control parameter to the corresponding motor controller via said transmission means, said transmission means serial-transmits said data in accordance with a predetermined transmission format, said parameter updating command means transmits the updated value of said control parameter and a parameter code denoting the type of said control parameter to said transmitting means while allocating them to predetermined bits in one word of said transmission format, each of said motor controllers includes receiving means for receiving said data supplied from said plant controller via said transmission passages, control means having controlling characteristics defined by a set value of at least one control parameter and acting to control said motors in accordance with said control commands received by said receiving means and control parameter updating means for updating said set value of said control parameter in accordance with said updated value of said control parameter, said receiving means transmits said parameter code and said updated value to said control parameter updating means after dividing them in accordance with said transmission format, and said control parameter updating means updates the set value of said control parameter which corresponds to said parameter code in accordance with said updated value.

11. A motor control system according to claim 10, wherein said control parameter includes at least one of a control gain including at least one of a proportional gain and an integration gain of the motor control system, a current value limit for said motor and a set inertia moment for a motor kinetic system.

12. A motor control system according to claim 11, wherein, when a plurality of control parameters are to be updated, said control parameter updating means one by one stores them in said transmission format in every transmission period of said transmission means.

13. A motor control system comprising:
a plurality of motor controllers for respectively controlling a plurality of motors for respectively driving a plurality of process machines which constitute a rolling mill plant having at least one of a rolling line and a line for annealing a rolled material; and
a plant controller for collectively controlling said plurality of motor controllers, wherein
said plant controller includes a plurality of control command generating means for respectively generating commands for controlling said motors in accordance with an operational condition of said rolling mill plant, transmission means for transmitting data including said control commands to said motor controllers via transmission passages, control parameter calculating means for calculating an updated value of a control parameter for at least one of said motor controllers in accordance with a change in said operational condition which is a change in at least one of the type, the thickness, and the weight of said rolled material, and parameter updating command means for transmitting said updated value of said control parameter to the corresponding motor controller via said transmission means,
said transmission means serial-transmits said data in accordance with a predetermined transmission format,
said parameter updating command means transmits the updated value of said control parameter and a parameter code denoting the type of said control parameter to said transmission means while allocating them to predetermined bits in one word of said transmission format,
each of said motor controllers includes receiving means for receiving said data supplied from said plant controller via said transmission passages, control means having controlling characteristics defined by a set value of at least one control parameter and acting to control said motors in accordance with said control commands received by said receiving means and control parameter updating means for updating said set value of said control parameter in accordance with said updated value of said control parameter,
said receiving means transmits said parameter code and said updated value to said control parameter updating means after dividing them in accordance with said transmission format, and
said control parameter updating means updates the set value of said control parameter which corresponds to said parameter code in accordance with said updated value.

14. A motor control system according to claim 13, wherein said control parameter includes at least one of a control gain including at lest one of a proportional gain and an integration gain of the motor control system, a current value limit for said motor and a set inertia moment for a motor kinetic system.

15. A motor control system according to claim 13, wherein, when a plurality of control parameters are to be updated, said control parameter updating means one by one stores them in said transmission format in every transmission period of said transmission means.

16. A motor control system according to claim 13, wherein said process machines include a plurality of helper rolls for said line for annealing said rolled material and said control parameter for said motor controller for each of said helper rolls is a control gain capable of absorbing a change in the inertia moment of a motor kinetic system due to the change in the at least one of the type, the thickness, and the weight of said rolled material.

17. A motor control system according to claim 16, wherein said parameter updating command means calculates a timing at which said change in said operational condition affects said process machines so as to transmit said updated value of said control parameter at said calculated timing.

18. A motor control system according to claim 13, wherein said process machines include a deflector roll for said rolling line and said control parameter for said motor controller for said deflector roll includes upper and lower limits of an electric current to be supplied to said motor.

19. A motor control system according to claim 18, wherein said parameter updating command means calculates a timing at which said change in said operational condition affects said process machines so as to transmit said updated value of said control parameter at said calculated timing.

20. A motor control system according to claim 19, wherein said control parameter includes a proportional gain capable of absorbing a change in the inertia moment of a motor kinetic system due to the change in the at least one of the type, the thickness, and the weight of said rolled material.

21. A motor control system comprising:
a plurality of motor controllers for respectively controlling a plurality of motors for respectively driving a plurality of helper rolls which constitute a plant for annealing a rolled material; and
a plant controller for collectively controlling said plurality of motor controllers, wherein
said plant controller includes a plurality of control command generating means for respectively generating control commands, which include a speed command and an electric command for each of said motors, in accordance with an operational condition of said annealing plant, transmission means for transmitting data including each of said control commands to each of said motor controllers via transmission passages, control parameter calculating means for calculating an updated value of a control parameter for at least one of said motor controllers in accordance with a change in said operational condition of said annealing plant and parameter updating command means for transmitting said updated value of said control parameter to the corresponding motor controller via said transmission means,
said transmission means serial-transmits said data in accordance with a predetermined transmission format,
said parameter updating command means transmits the updated value of said control parameter and a parameter code denoting the type of said control parameter to said transmission means while allocating them to predetermined bits in one word of said transmission format, each of said motor controllers includes receiving means for receiving said data supplied from said plant controller via said transmission passages, control means having at least one of speed controlling characteristics and current controlling characteristics defined by a set value of at least one control parameter and acting to control said motors in accordance with said control commands received by said receiving means and control parameter updating means for updating said set value of said control parameter in accordance with said updated value of said control parameter, said receiving means transmits said parameter code and said updated value to said control parameter updating means after dividing them in accordance with said transmission format, and said control parameter updating means has a collation table between said parameter codes and the types of said control parameters, and updates the set value of said control parameter which corresponds to said parameter code in accordance with said updated value supplied while collating to said collation table.

22. A motor control system according to claim 21, wherein, when a plurality of control parameters are to be updated, said control parameters updating means one by one stores them in said transmission format in every transmission period of said transmission means.

23. A motor control system according to claim 21, wherein said control parameter includes at lest one of a control gain including at least one of a proportional gain and an integration gain of the motor control system, a current value limit for said motor and a set inertia moment for a motor kinetic system.

24. A motor control system according to claim 21, wherein said parameter updating command means calculates a timing at which said change in said operational condition affects said helper roll so as to transmit said updated value of said control parameter at said calculated timing.

* * * * *